United States Patent [19]

Eichelberger et al.

[11] Patent Number: 4,646,152
[45] Date of Patent: Feb. 24, 1987

[54] SHARPNESS ENHANCED EQUAL BANDWIDTH LUMINANCE BANDWIDTH COMPRESSION SYSTEM

[75] Inventors: Charles W. Eichelberger, Schenectady; Robert J. Wojnarowski, Ballston Lake; Theodore G. Mihran, Schenectady, all of N.Y.

[73] Assignee: General Electric Company, Schenectady, N.Y.

[21] Appl. No.: 697,600

[22] Filed: Feb. 1, 1985

[51] Int. Cl.⁴ .......................... H04N 5/14; H04N 5/38
[52] U.S. Cl. ...................................... 358/166; 358/37; 358/38; 358/186
[58] Field of Search ..................... 358/166, 37, 38, 39, 358/186, 187

[56] References Cited

U.S. PATENT DOCUMENTS

| | | | |
|---|---|---|---|
| 4,074,308 | 2/1978 | Gibson | 358/166 |
| 4,376,952 | 3/1983 | Troiano | 358/38 |
| 4,402,006 | 8/1983 | Karlock | 358/166 |
| 4,403,255 | 9/1983 | Schiff | 358/186 |

Primary Examiner—Michael A. Masinick
Assistant Examiner—Robert M. Bauer
Attorney, Agent, or Firm—Marvin Snyder; James C. Davis, Jr.

[57] ABSTRACT

Circuitry for enhancing the sharpness of bandwidth compressed television signals provides equalization in only the transmitter with no equalization required in the receiver. The transmitter includes a linear phase delay and edge peaking circuit, a low pass filter and an equalization circuit. The linear phase delay and edge peaking circuit includes a tapped delay line which provides weighted output signals for differential phase delays. The weighted output signals of the tapped delay line are differentially combined to provide a combined output signal. This combined output signal and a signal from the tapped delay line are supplied to a peaking circuit. A clamping circuit is connected to limit the amplitude of high level signals in the combined output signal so that small transitions are peaked to a greater degree than large transitions.

12 Claims, 18 Drawing Figures

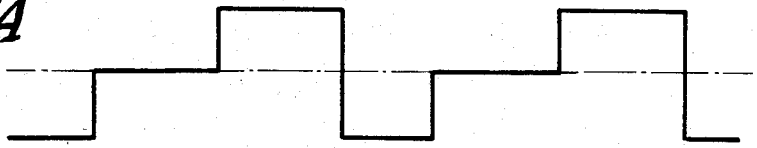
Fig. 6A STEP INPUT
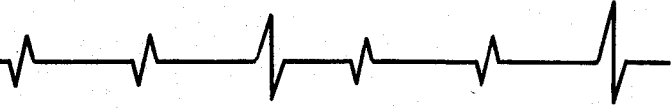
Fig. 6B LOW PASS FILTER 124 OUTPUT
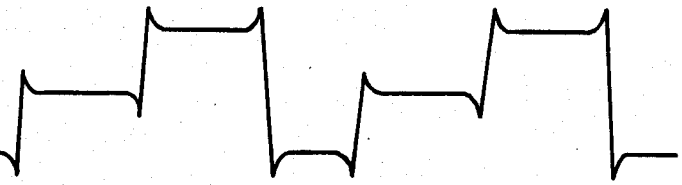
Fig. 6C RESULTANT OUTPUT (WITH PEAKING)
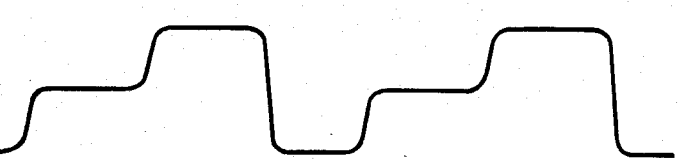
Fig. 6D RESULTANT OUTPUT (WITHOUT PEAKING)
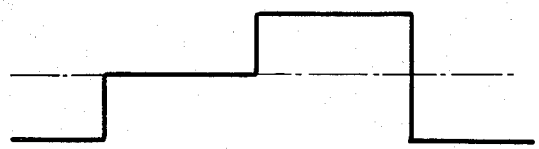
Fig. 7A STEP INPUT
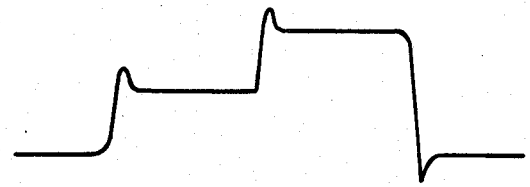
Fig. 7B NO PEAKING
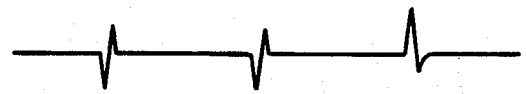
Fig. 7C NODE 1
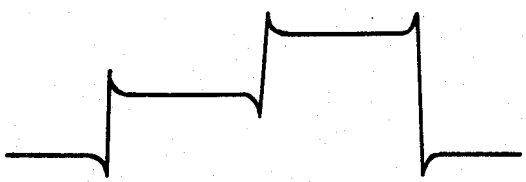
Fig. 7D WITH UNEVEN TAP WEIGHTS

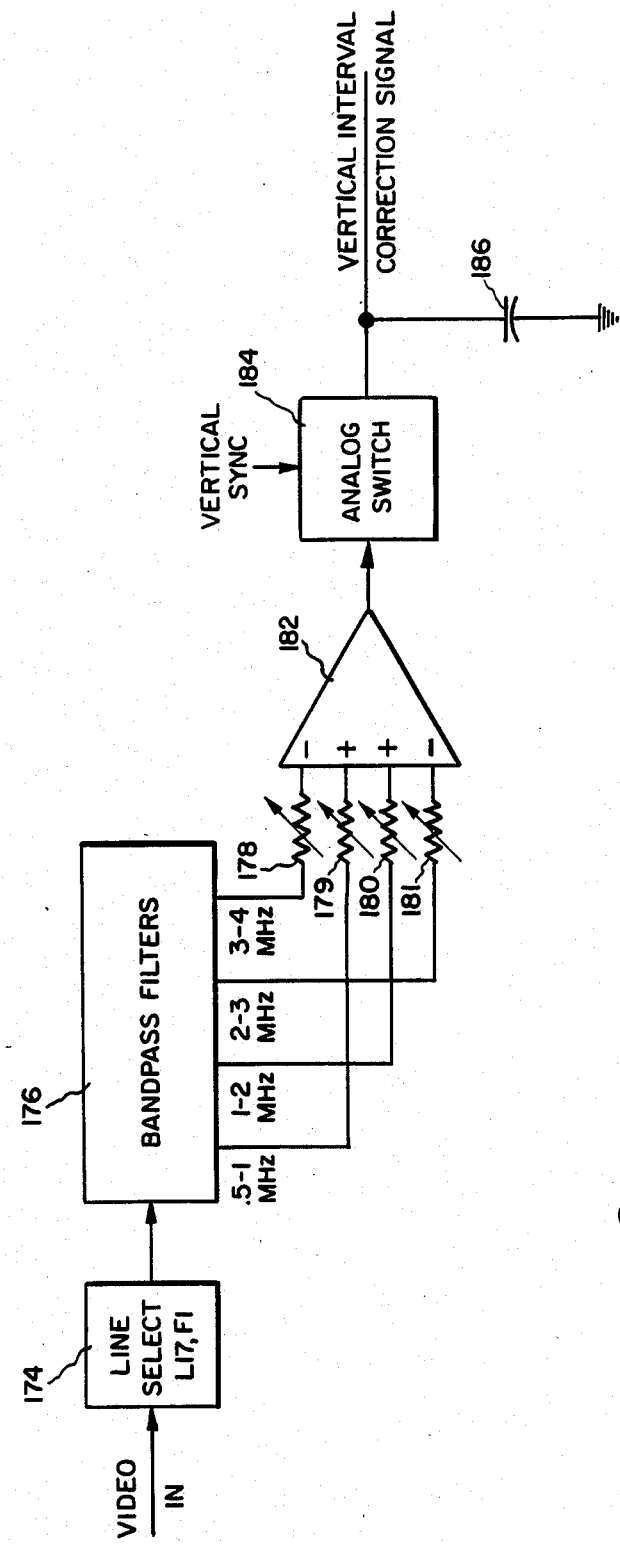

SHARPNESS ENHANCED EQUAL BANDWIDTH LUMINANCE BANDWIDTH COMPRESSION SYSTEM

CROSS REFERENCE TO RELATED APPLICATIONS

This application discloses subject matter which is related to the subject matter disclosed in the following copending and commonly assigned applications and commonly assigned U.S. Patent:

U.S. Pat. No. 4,533,960 issued to Tiemann, Cutler and Welles for "System for Encoding and Decoding Video Signals".

U.S. Pat. No. 4,533,936 issued to Tieman and Engeler for "System for Encoding and Decoding Video Signals".

U.S. Ser. No. 697,535 filed concurrently herewith by Eichelberger and Wojnarowski for "Chrominance Time-Compressed, Luminance Bandwidth-Reduced Television System".

U.S. Ser. No. 697,560 filed concurrently herewith by Wojnarowski and Eichelberger for "Alternate Field Luminance Enhancement in a Spectrum Conserving Television System".

U.S. Ser. No. 697,601 filed concurrently herewith by Welles, Eichelberger and Wojnarowski for "Television Frame Synchronizer with Independently Controllable Input/Output Rates".

The disclosures of the foregoing copending patent applications are incorporated herein by reference.

BACKGROUND OF THE INVENTION

The present invention generally relates to television bandwidth reduction techniques and, more particularly, relates to a method and apparatus for enhancing the sharpness of bandwidth compressed pictures.

One approach to bandwidth compression is to limit the luminance bandwidth of two signals to fit in the channel space avilable. In a typical system, 4.5 MHz of the total six megahertz channel is available for luminance information. The rest of the channel is required for sound and channel guardband. The maximum available frequency for luminance for each channel is one-half of 4.5 MHz, or 2.25 MHz. When a sharp cutoff filter is used to limit the luminance of the picture to 2.25 MHz, the picture appears soft. In addition, edges of the picture tend to ring in the filter and cause ghosts at the edge. A slow roll-off filter does not ring, but makes the picture appear softer yet. Equalization can be used to reduce ringing in filters due to improvements in group delay. However, equalizing networks are expensive and take up space and are therefore not desirable in the receiver because both cost and space are at a premium.

SUMMARY OF THE INVENTION

It is therefore an object of the present invention to provide a luminance bandwidth-reduced system with apparent sharpness normally associated with a high luminance bandwidth without degradation due to ringing or ghosting artifacts.

It is another object of this invention to provide a filtering method in which all equalization can be accomplished in the transmitter, thus reducing the cost of the receiver.

It is a further object of the instant invention to provide a system which peaks small transitions to a greater degree than large transitions, thereby reducing severe artifacts on large transitions.

According to the invention, the technique employed for enhancing the sharpness of pictures involves edge peaking using a tapped delay line differentiating circuit. The edge peaking output is then filtered in a filter which exhibits a slow roll-off response until a 6 dB reduction in output level is achieved and then exhibits a sharp cutoff response. This filter is followed by an equalization network which provides equalization for both the filter in the transmitter and a second filter in the receiver. The filter in the receiver completes the chain and is again a filter which exhibits a slow roll-off response until 6 dB and then exhibits a sharp cutoff response.

Prior art bandwidth compression systems ordinarily send a high bandwidth line followed by a low bandwidth correction signal and use the low bandwidth correction signal in conjunction with the first high bandwidth line to form the second line in the picture. These systems are sometimes referred to as A+B, A−B systems. The system according to the present invention is fundamentally different in that equal bandwidth luminance signals are sent for each line of the pictures resulting in a picture free from the jaggy artifacts associated with the A+B, A−B strategies.

It is well known in the art that sharp cutoff filtering produces ringing, and that ringing can be reduced by reducing the cutoff rate of the filter and by equalizing the filter group delay. The subject invention distinguishes over the prior art in that the equalization for both the receiver and the transmitter is placed in the transmitter and the use of a tapped delay line with properly adjusted peaking increases sharpness without increasing ringing. The subject invention also distinguishes over the prior art in that small transitions are peaked to a greater degree than large transitions.

BRIEF DESCRIPTION OF THE DRAWINGS

The foregoing and other objects, aspects and advantages of the invention will be better understood from the following detailed description of the invention with reference to the drawings, in which:

FIGS. 6A to 6D are waveform diagrams illustrating sharpness enchanced waveforms produced by the invention;

FIGS. 7A to 7D are waveform diagrams illustrating the effect of optimized tap weights on the tapped delay line shown in FIG. 4;

FIG. 10 is a block diagram of a vertical interval correction circuit used to generate another one of the control signals for the automatic adjustment of the peaking function.

DETAILED DESCRIPTION OF THE INVENTION

Figure 1A:
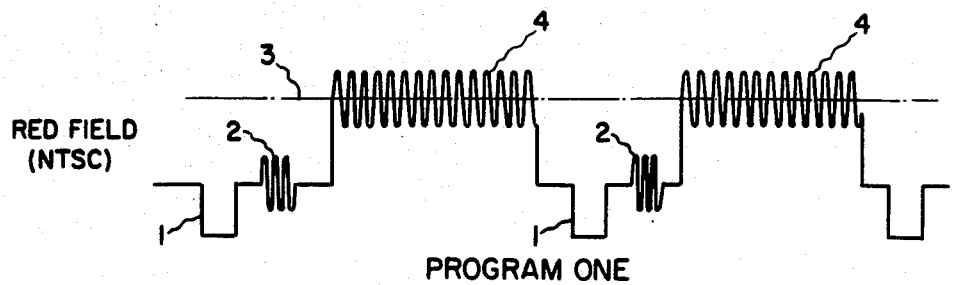
FIGS. 1A, 1B and 1C are drawings of waveforms showing two signals in the NTSC format and a video signal formatted according to the chrominance time-compressed, luminance bandwidth-reduced television system which is a combination of the information of the two NTSC signals.
Figure 1B:
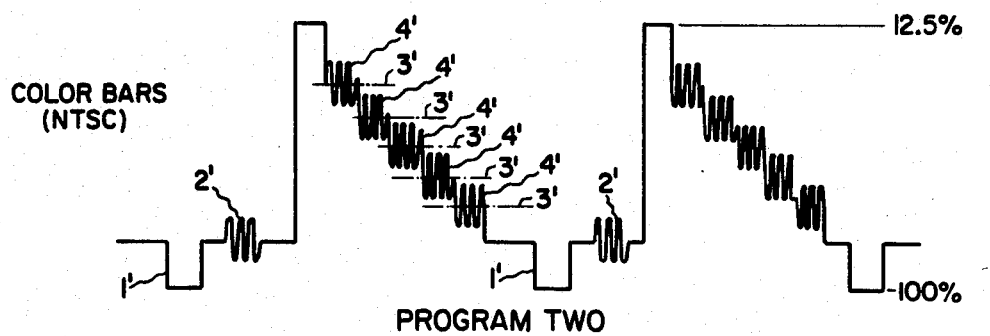
Figure 1C:
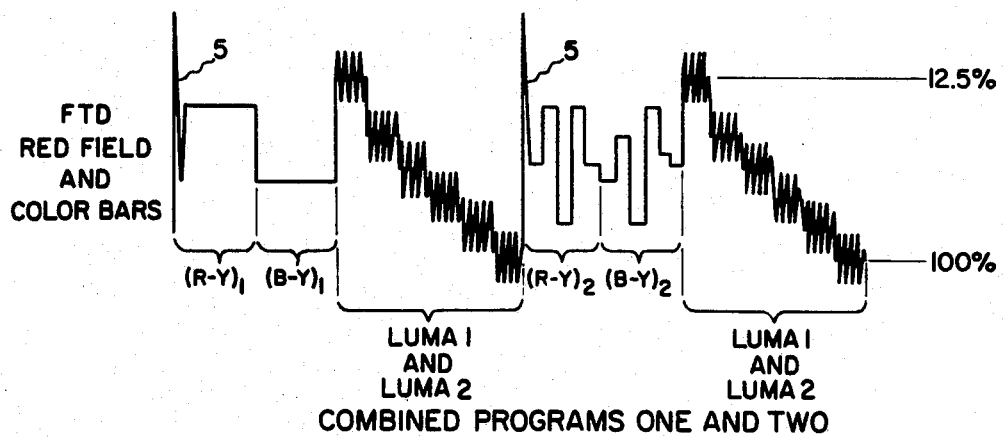

The present invention is preferably practiced in the chrominance time-compressed, luminance bandwidth-reduced television system disclosed in copending patent application U.S. Ser. No. 697,535 filed by Eichelberger and Wojnarowski. Before describing the present invention, there is first presented a brief description of the aforementioned chrominance time-compressed, luminance bandwidth-reduced television system. Referring now to the drawings, and more particularly to FIGS. 1A, 1B and 1C, there are shown two video signals in the NTSC format and a composite video signal as generated according to the chrominance time-compressed, luminance bandwidth-reduced television system. A video signal as represented in FIG. 1A may be utilized by a television receiver to generate a flat red field, and a video signal as represented in FIG. 1B may be utilized by a television receiver to generate color bars. As shown in FIG. 1A, a horizontal line of program one consists of a sync pulse 1 and a color burst 2, followed by a luminance level 3 with the chrominance subcarrier information 4 riding thereon. As shown in FIG. 1B, program two consists of a sync pulse 1' and a color burst 2', followed by luminance information 3' at various levels with chrominance information 4' at various phases of the color subcarrier representing the various colors. FIG. 1C shows the recovered baseband signal produced in the receiver. The waveform in FIG. 1C comprises a narrowed sync pulse 5 followed by R-Y and B-Y chrominance information derived from program one as signified by the subscript 1. R, B and Y are abbreviations for red, blue and luminance, respectively, and the R-Y and B-Y signals are termed the color difference signals. With the NTSC signals synchronized as shown in FIGS. 1A and 1B, the R-Y and B-Y information for a line is sent during the inactive video time. This time includes the horizontal retrace time and overscan time. During the active video portion of the signal, the luminance for program one occurs as baseband information while luminance for program two is encoded as the modulation of a subcarrier 4.5 MHz removed from the main carrier. Following the luminance information for the first line is another narrowed sync pulse 5 followed by compressed R-Y and B-Y chrominance information signals derived from program two as signified by the subscript 2. Again, the luminance information for both programs is encoded during the active video time. It is important to note that the R-Y and B-Y chrominance information for a given line is available before the active video portion of that line. Note also that both luminance signals for program one and for program two are available during each active video line.

Figure 2:
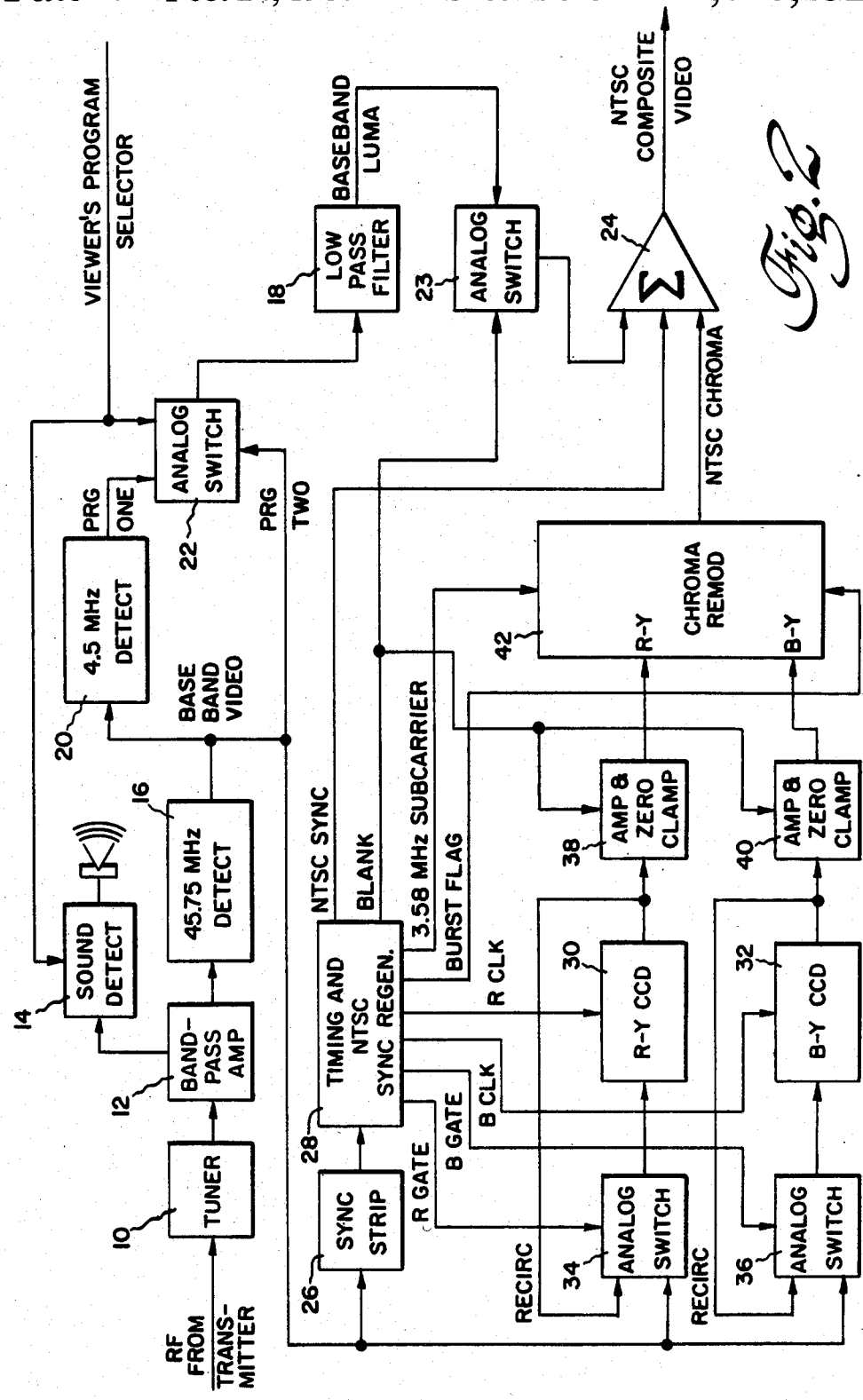
FIG. 2 is a block diagram of a receiver of the chrominance time-compressed, luminance bandwidth-reduced television system.

FIG. 2 shows a block diagram of a receiver useful for reconstructing NTSC composite video signals according to the chrominance time-compressed, luminance bandwidth-reduced television system. Radio frequency (RF) from a cable television system or from an antenna is fed into a tuner 10 which selects the desired channel and provides at its output an intermediate frequency (IF) signal. This IF signal is fed to a bandpass amplifier 12 which rejects unwanted signals adjacent in frequency. Part of the signal is picked off and set to the sound detector 14 which detects the appropriate sound carrier for the selected channel and demodulates the sound. The bandpassed IF video signal is sent to a synchronous detector 16, the output of which is baseband video of the form shown in FIG. 1C. Luminance information is extracted by the low pass filter 18. The switch 22 selects either the output signal of synchronous detector 16 or the output signal of synchronous detector 20 for filtering. Synchronous detector 20 detects the baseband video at the 4.5 MHz subcarrier to extract the luminance signal for program two. Thus, the luminance information for program one or program two is extracted depending on the condition of switch 22. In either case, the resulting output signal from the low pass filter 18 is supplied via another analog switch 23 to one input of summing amplifier 24 which provides the NTSC composite video output signal. Filter 18 is the subject of the present invention and will be described in more detail hereinafter.

The sync information is stripped from the baseband video in sync stripper 26 and used to control sync and timing for the rest of the system. Circuit 28 generates timing for the system and also provides the NTSC composite sync to an input of summing amplifier 24.

The baseband information is also furnished to two charge coupled delay (CCD) lines 30 and 32 via switches 34 and 36. These delay lines store the B-Y and R-Y information, and when the chrominance information for the desired program is available during horizontal retrace time, switches 34 and 36 are switched to receive the baseband video. High speed clock pulses first load the R-Y CCD 30 and then the B-Y CCD 32. When the active video region is entered, the clock is slowed to one-eighth to one-twelfth of the high speed value, and switches 34 and 36 are switched to the recirculate positions. As the R-Y and B-Y information is clocked from the CCDs, that same information is recirculated back into the inputs of the CCDs and in so doing, the same chrominance information can be repeated on two adjacent horizontal lines. The output signals of the CCDs 30 and 32 are fed to respective amplifiers 38 and 40 which have their outputs connected to chrominance remodulator 42. The output signal of the remodulator 42 is an NTSC chrominance signal that is supplied to yet another input of the summing amplifier 24 thereby completing the synthesis of the NTSC standard composite video signal which can be sent to an ordinary television set.

Figure 3:
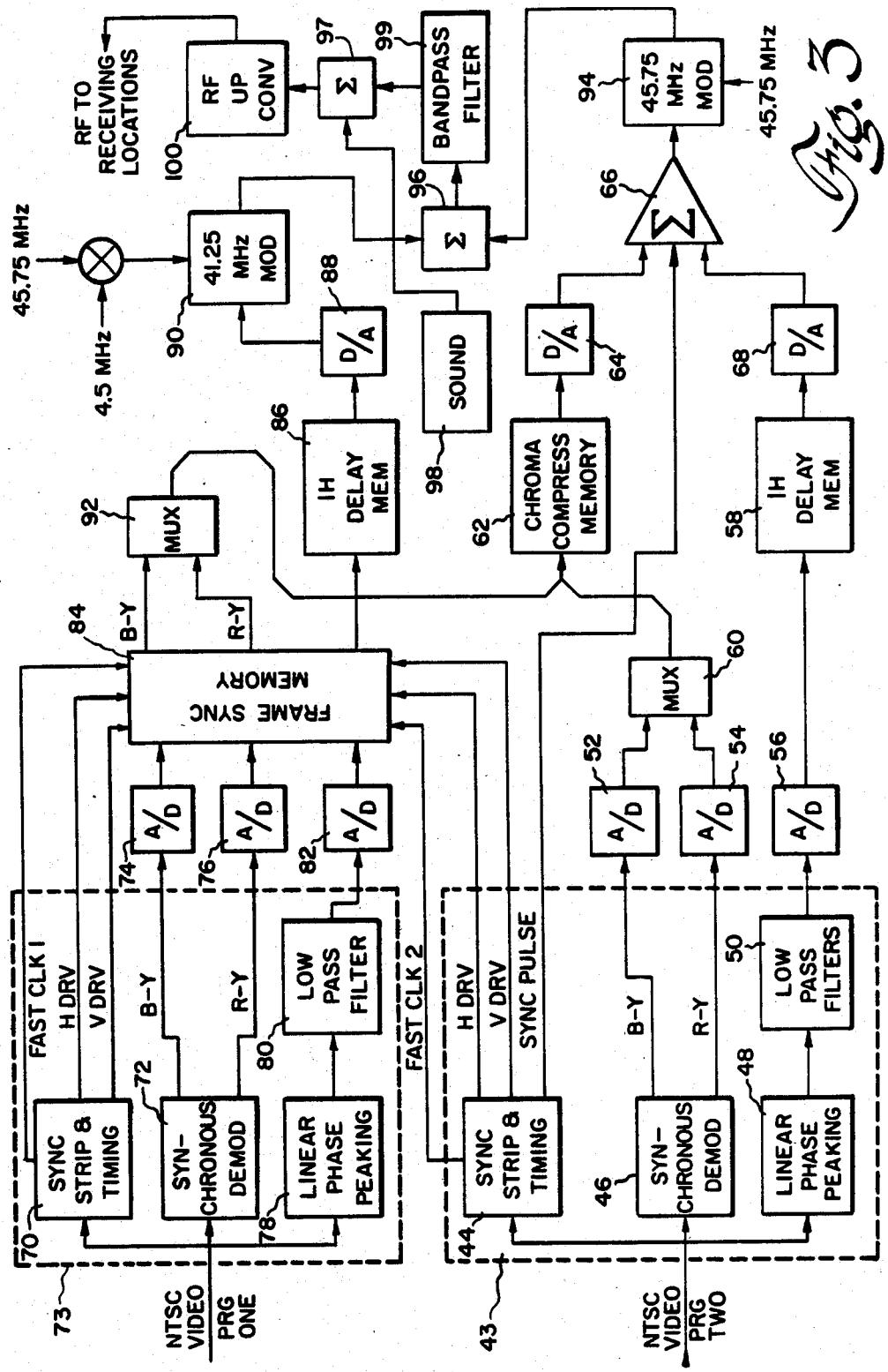
FIG. 3 is a block diagram of a transmitter of the chrominance time-compressed, luminance bandwidth-reduced television system.

FIG. 3 shows a block diagram of the transmitter. Beginning the description in terms of the inputs receiving program two at the video processor circuitry 43, a sync stripping circuit 44 strips the sync signal and identifies the horizontal and vertical intervals in the NTSC standard baseband input signal. The chrominance information is split into the quadrature R-Y and B-Y components using a chrominance demodulator circuit 46. The luminance information is processed by limiting its bandwidth so that it can be accommodated by a predetermined channel bandwidth. A linear phase peaking circuit 48 and low pass filter 50 are used. This linear phase peaking circuit 48 and filter 50 are the subject of the present invention and will be described in more detail hereinafter. However, for the moment, notice that it is at this point that equalization of frequency components in time is supplied to the system and that no other equalization is required in the receiver. Such equalization is well known in the art and need not be described further.

The three output signals B-Y, R-Y and filtered luminance are each converted to digital values by analog-to-digital (A/D) converters 52, 54 and 56, respectively. The luminance data from A/D converter 56 is sent to a memory 58 which provides one horizontal line of delay in order to accommodate the fact that the compressed chrominance cannot be sent until all the chrominance information for a given line has been received. The chrominance from A/D converters 52 and 54 is multiplexed by multiplexer 60 into a chrominance compression memory 62 which is written during the active video time and read out at a fast during the horizontal retrace time thereby compressing in time the chrominance information. The output signal of the chrominance compression memory 62 is fed to a digital-to-analog (D/A) converter 64 and is subsequently combined in summing amplifier 66 with the output signal of a D/A converter 68 attached to the output of the memory 58. The narrowed sync pulse is also combined in summing amplifier 66 with the chrominance and luminance signals.

Program one is handled in essentially the same way. The sync pulse is stripped in sync stripper 70 of video processor circuitry 73 to identify horizontal and vertical intervals. The chrominance signal information is demodulated in demodulator 72 and converted to digital signals in A/D converters 74 and 76, and the luminance signal is appropriately peaked and filtered in linear phase peaking circuit 78 and low pass filter 80 and then converted to a digital signal in A/D converter 82. Again, the linear phase peaking circuit 78 and low pass filter 80, which are identical to linear phase peaking circuit 48 and filter 50, are the subject of the present invention.

At this point in the processing of the signals from the source of program one, the digital signals are entered into a frame synchronizing memory 84 which is used to exactly match horizontal and vertical intervals between program one and program two. This is necessary in order to insure that the horizontal retrace time, during which time the chrominance for program one or program two is sent, and the active video time, during which time luminance information for both programs is sent, are aligned between the two programs.

The luminance from program one is used to amplitude modulate an IF subcarrier whose frequency is 41.25 MHz in IF modulator 90. The subcarrier frequency of 41.25 MHz is 4.5 MHZ away from the main IF carrier frequency of 45.75 MHz. The output of the chrominance information from the frame synchronizer memory 84 is multiplexed to the chrominance compression memory 62 via multiplexer 92. During one line, program one chrominance information is written to the memory 62 during the active video portion, and on the next line, chrominance information from program two is written to the memory 62. Always during the horizontal retrace time, data written to the chrominance compression memory 62 is read from the memory at high speed, converted to an analog signal through D/A converter 64, and combined with the luminance of program two and the narrowed sync pulse in summing amplifier 66. The output signal of summing amplifier 66 is used to modulate the main IF carrier frequency of 45.75 MHz in modulator 94. The output signals of modulators 90 and 94 are combined in a hybrid combiner 96 and supplied to a bandpass filter 99 which filters the combined output signals. The sound carriers from sound circuit 98 for the two programs are supplied to a hybrid combiner 97 which combines the output signal of bandpass filter 99 and the audio. The output signal of hybrid combiner 97 is used to drive an RF up converter 100.

Figure 4:
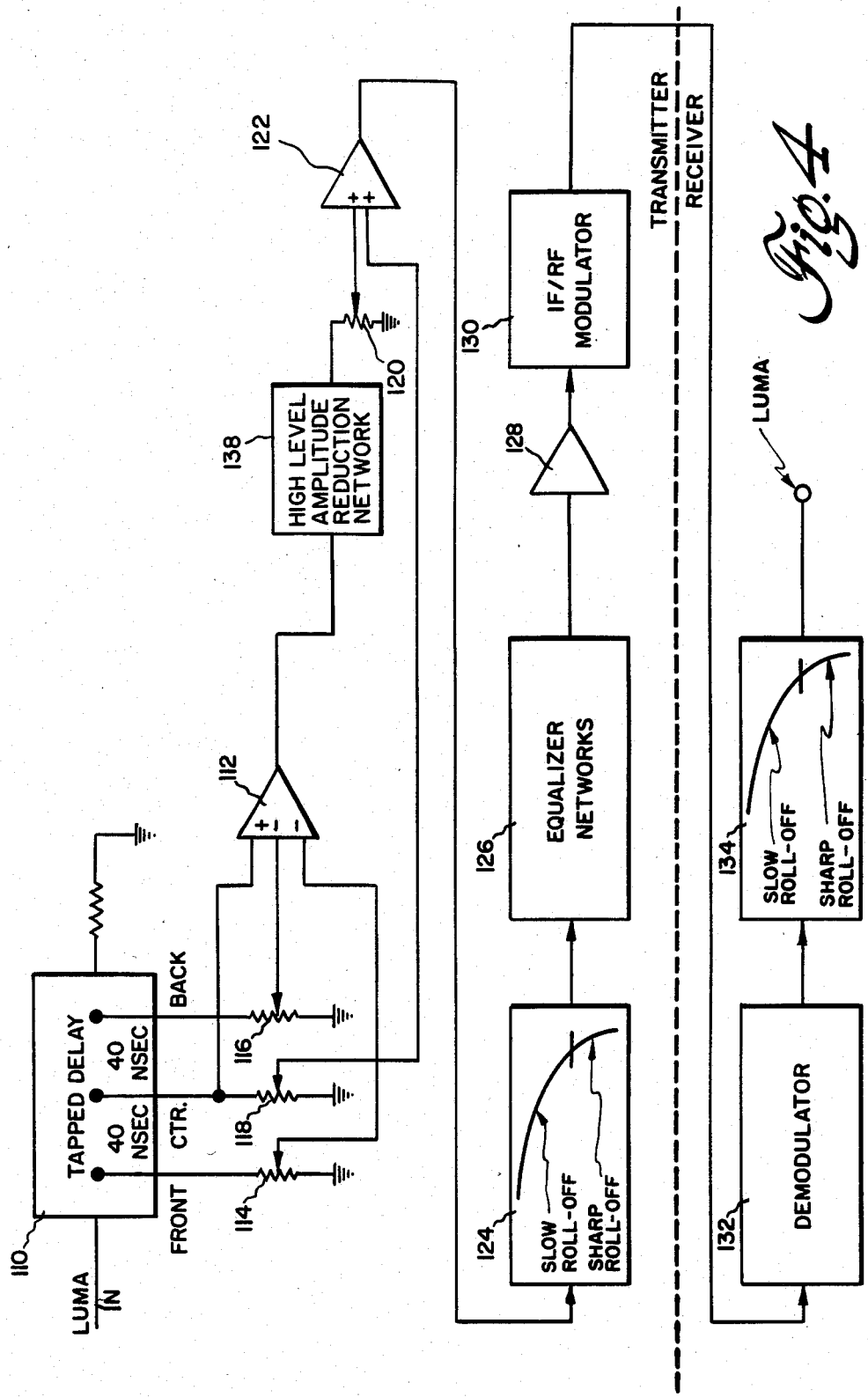
FIG. 4 is an overall block diagram of the edge peaking and filtering enhancement circuitry according to the present invention.

FIG. 4 shows a simplified overall block diagram of the present invention. It will be understood from the following discussion that the invention is preferably practiced in the chrominance time-compressed, luminance band-width-reduced television system just described but that the invention is not limited thereto. The principles of the invention could be applied to other bandwidth compression systems where it is desired to enhance the sharpness of the television picture. With specific reference to FIG. 4, the luminance information enters a tapped delay line 110 with taps for signal delays separated by approximately 40 nanoseconds. The delay line 110 may be implemented as a lumped constant LC delay line of conventional design. The front and back tap of the delay line connect to minus inputs of a differencing amplifier 112, while the center tap connects to a plus input of the same amplifier. Amplifier 112 may be implemented with a high gain, negative feedback operational amplifier of conventional design. The tap weights are adjusted by means of potentiometers 114 and 116 connected to the front and back taps of the delay line 110 to give the minus inputs a weight of approximately one-half and the plus input a weight of approximately one. A third potentiometer 118 is connected to the center tap of the delay line 110, but it will be noted in the figure that the connection to the positive input of amplifier 112 is a direct connection to the center tap and not from the wiper of potentiometer 118. It should be noted that adjusting these tap weights away from the ½, 1 and ½ settings is a necessary part of the invention in order to obtain optimal sharpness as will be explained. The amount of peaking is controlled by a potentiometer 120 which connects a portion of the output signal from amplifier 112 through a high level amplitude reduction network 138 to a summing amplifier 122 which sums the signal from the wiper of potentiometer 120 with the signal from the wiper of potentiometer 118 connected to the center tap of delay line 110.

Figure 5:
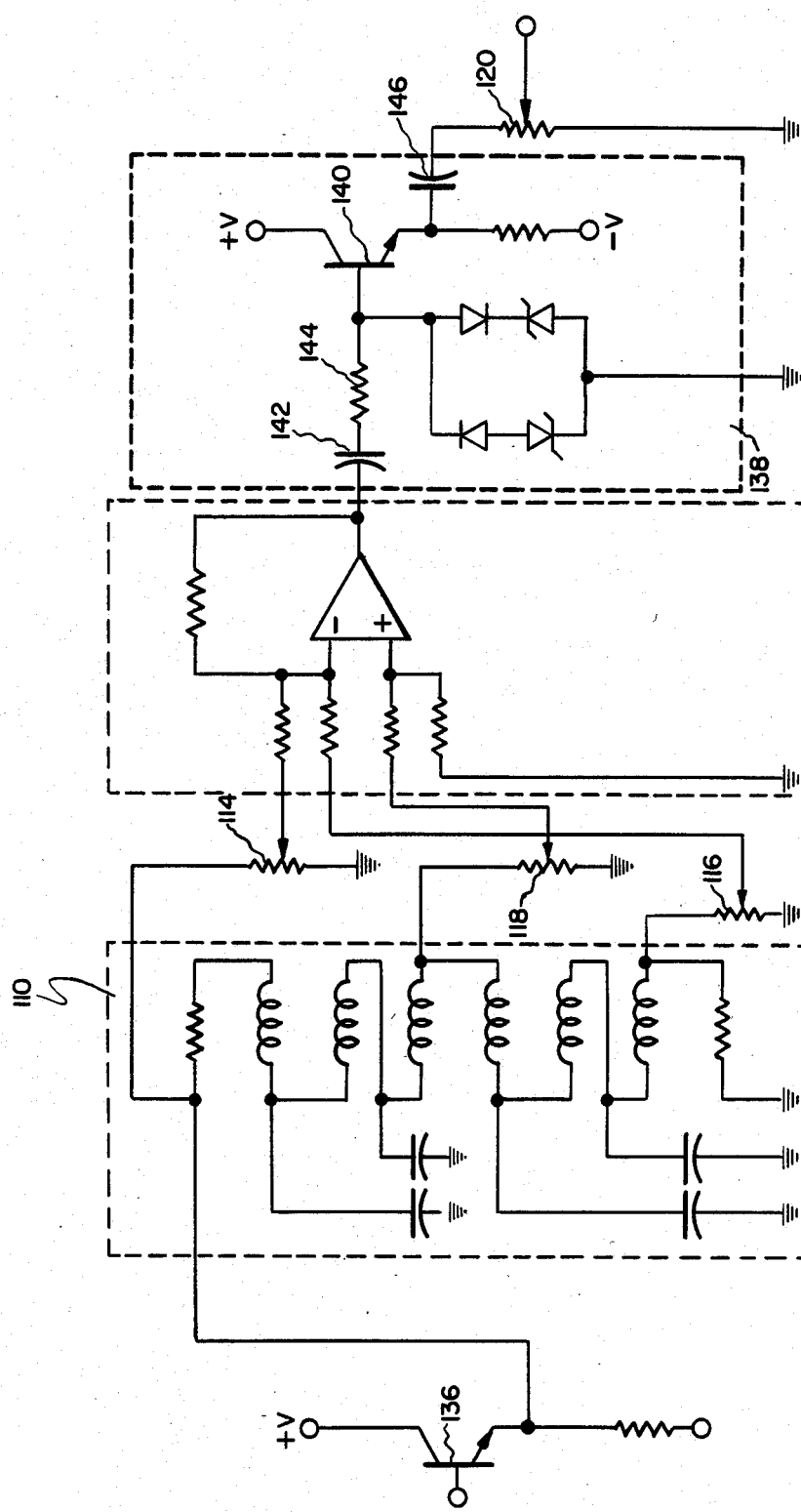
FIG. 5 is a schematic diagram of the edge peaking circuitry according to the invention.

FIG. 5 shows a schematic diagram of the circuitry described thus far. The signal to the tapped delay line 110 is supplied by an emitter follower 136. The output of amplifier 112 is connected via a network 138 to the peaking potentiometer 120. The purpose of this network is to peak small transitions to a greater degree than large transitions and, as a result, reduce severe artifacts on large transitions. The network 138 comprises an emitter follower 140 having its base connected to the output of amplifier 112 via series connected capacitor 142 and resistor 144 and having its emitter connected to peaking potentiometer 120 via capacitor 146. The base circuit of the emitter follower 140 is connected to ground by a diode network having two parallel branches with each branch having a conventional diode and a Zener diode connected back-to-back and the diodes of the two branches polarized to conduct current in opposite directions. It will be recognized that this network constitutes a clamping circuit which conducts current of either polarity whenever the breakdown voltages of the Zener diodes are exceeded, thereby limiting the base drive to emitter follower 140. The circuit thus acts to reduce the amplitude of high level signals. As a result, high levels of peaking can be obtained on low level signals with a reduced level of peaking on very high level signals. This allows the RF modulated signals to remain within modulation depth limit and prevents even severe artifacts on large transitions.

FIG. 6A shows the waveform of a step pattern signal applied to the input of the tapped delay line 110. As the step pattern signal traverses down the delay line, the output signal from amplifier 112 goes negative by $\frac{1}{2}$ and then positive by the same magnitude and then back to zero due to the cancelling of the negative and positive tap weights. This is shown in FIG. 6B.

Returning now to FIG. 4, the combined signal from amplifier 112 enters a low pass filter 124 followed by equalization networks 126 and an amplifier 128. The equalization networks are preferably implemented with lattice networks of parallel and series inductors and capacitors of conventional design.

In the aforementioned chrominance time-compressed, luminance bandwidth-reduced television system, the resultant signal from amplifier 128 is modulated by an RF modulator 130 and subsequently demodulated at the receiver in a demodulator 132 where it then passes through a second low pass filter 134. Both of the low pass filters 124 and 134 have the same characteristics, namely a slow roll-off transition down to 6 dB and then an abrupt cutoff. Suitable low pass filters exhibiting the required slow roll-off characteristics are those having a slow Gaussian transition and fifth order elliptical filters, both of which are well known in the art. Reference may be had to the *Handbook of Filter Synthesis* by Anatol I. Zverev published by John Wiley & Sons for the filter design. As a specific example, a ChebychevCauer or elliptic filter design having five poles and a ripple in the pass band of less than 2% was used. Filters with an odd number of poles are preferred due to the fact that filters with an even number of poles have a different input and output impedance. In this specific example, the desired impedance was 75 ohms. The table on pages 204 and 205 of the Zverev *Handbook* was used to select the basic filter design characteristics of $\theta = 21°$ and Amin=57 dB at $\omega_{3dBr}=8 \times 10^6$ rad/sec. A filter having these characteristics was connected to a Tektronix 1410 generator on the test design to check impulse response of a television system. The filter was adjusted for minimum ripple on each side of the impulse pulse. This extended the filter response greatly from the designed response but had the effect of eliminating ringing and cross modulation distortions in the RF circuits.

The resultant output signal at the receiver with all circuitry properly adjusted and with perfect equalization accounting for both the receiver and the transmitter filters at the transmitter will be as shown in FIG. 6C. For each step, there will be first a negative preshoot followed by the step transition and finally a positive overshoot. This will result in a sharper edge being defined. If the peaking potentiometer 120 is turned to zero so that no peaking is applied, it can be seen in FIG. 6D that the transitions of the step pattern will be relatively slow.

Thus far, ideal equalization has been assumed; however, practical equalization circuits cannot completely compensate for the fact that conventional filters delay the high frequencies more than the low frequencies. As a result, FIG. 7B shows the output signal from low pass filter 134 with peaking turned all the way down for the step input signal shown in FIG. 7A. It can be seen that there is very little preshoot and a large amount of overshoot in the signal. This is undesirable because it is unsymmetrical and additional peaking will result in too much overshoot. To account for the nonideal equalization, the potentiometers 114, 116 and 118 connected to the taps of delay line 110 can be adjusted such that the front tap weight is greater than the back tap weight. For example, $-\frac{3}{4}$ on the front and $-\frac{1}{4}$ on the back. FIG. 7C shows the resultant output signal. Now there is a very strong preshoot without much overshoot. When the output signal of amplifier 112 is summed with the signal from the wiper of potentiometer 118 and that resultant signal is passed through the transmitter and receiver low pass filters 124 and 134, the final resulting signal as shown in FIG. 7D is shown to have an equal amount of preshoot and overshoot. This symmetrical condition allows the greatest amount of peaking before the preshoot and postshoot effects become objectionable.

Figure 8:
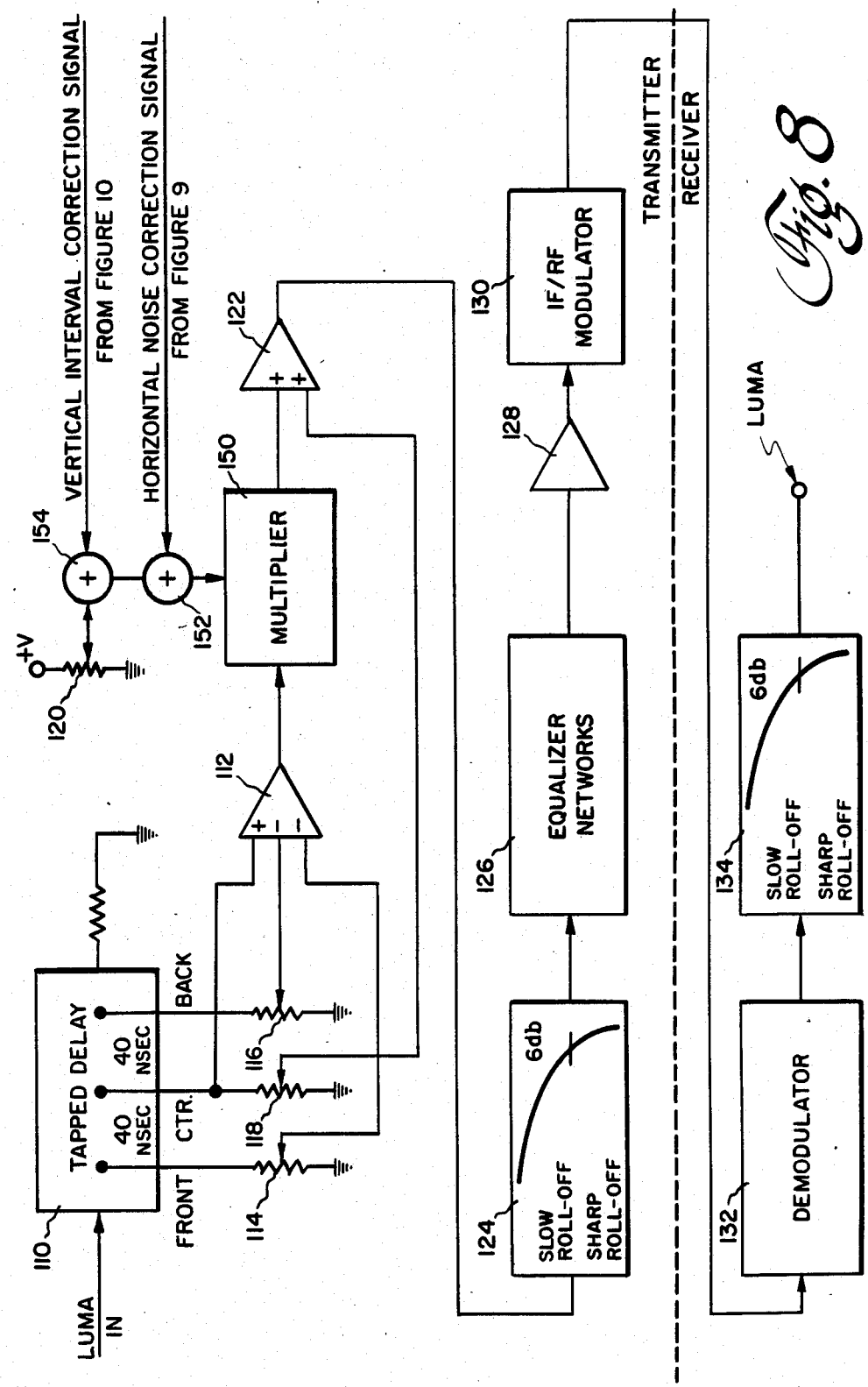
FIG. 8 is a block diagram similar to FIG. 4 showing a modification of the transmitter section to provide automatic adjustment of the peaking function.

FIG. 8 shows a modification of the transmitter section which provides an automatic adjustment of the peaking function. The same reference numerals as used in FIG. 4 designate the same circuits. What is added in FIG. 8 is a multiplier 150 and two adders 152 and 154. The output of amplifier 112 is no longer connected to one end of the peaking potentiometer 120 but is instead connected to one input of multiplier 150. Potentiometer 120 is now connected between a source of positive potential and ground, and the wiper of potentiometer 120 is connected to one input of adder 154. The output of adder 154 is connected to one input of adder 152, and the output of adder 152 is connected to the second input of multiplier 150. The second inputs of each of the adders 152 and 154 are supplied with correction signals which are required for the automatic peaking function. If the second inputs to each of the adders 152 and 154 are grounded, the circuit shown in FIG. 8 functions the same as that shown in FIG. 4.

Figure 9:
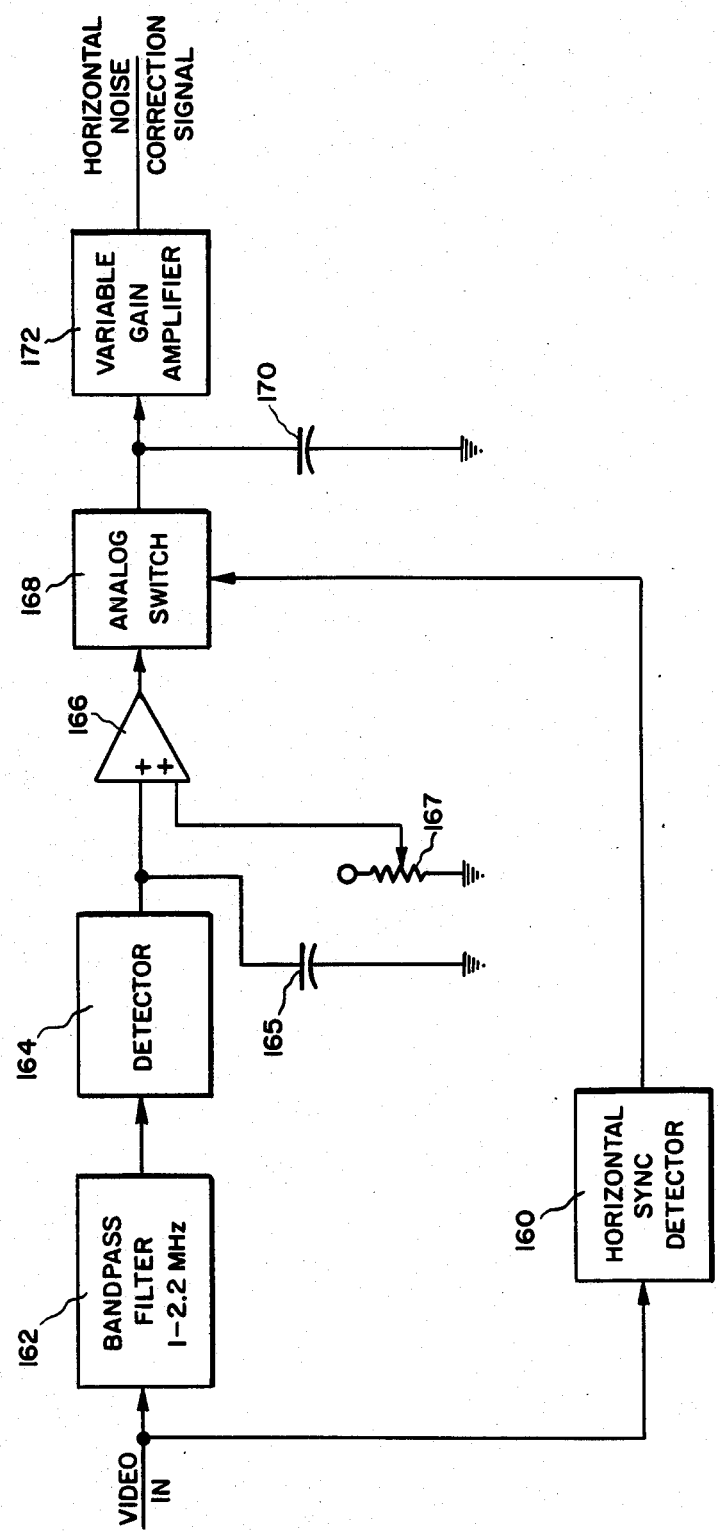
FIG. 9 is a block diagram of a horizontal noise detecting circuit used to generate one of the control signals for the automatic adjustment of the peaking function.

The second input signal to adder 152 is generated by the circuit shown in FIG. 9. This circuit is a horizontal noise detector. The input video signal is supplied to a horizontal sync detector 160 and also to a bandpass filter 162. The output signal from the bandpass filter 162 is detected to detector 164, and the detected signal is filtered by capacitor 165 and supplied to one input of operational amplifier 166. The other input to operational amplifier 166 is connected to potentiometer 167 which supplies a reference voltage to the amplifier. The output signal of the operational amplifier 166 is a voltage proportional to the detected horizontal noise. This offset voltage is sampled by an analog switch 168, such as a CD4066 video switch, each horizontal line under the control of the horizontal sync detector 160. The sampled voltage is stored for the duration of the line period in holding capacitor 170. The voltage across holding capacitor 170 is supplied to a variable gain amplifier 172 which generates a d.c. offset voltage which is supplied to the second input of adder 152 to lower the gain of the adder as a function of the noise present in the horizontally scanned area. The desired gain of the adder 152 is preset by grounding its second input.

FIG. 10 shows the circuit for generating the second input to adder 154. In this circuit, a vertical interval pulse is supplied on line 17 of field one, according to Federal Communications Commission (FCC) regulations regarding vertical interval test signals (VITS). The vertical interval pulse is selected in circuit 174 and supplied to a series of bandpass filters 176, such as a comb filter, having passbands of 0.5 to 1 MHz, 1 to 2

MHz, 2 to 3 MHz, and 3 to 4 MHz, or any other desired group of passbands. The several output signals of bandpass filter 176 are supplied to respective attenuators 178, 179, 180, and 181 which provide individually adjusted weights for the output signals. The weighted output signals are then summed in a summing amplifier 182 to generate the desired peaking function. In the example shown in FIG. 10, the weighted signals from 0.5 to 1 MHz and from 1 to 2 MHz are supplied as positive signals to summing amplifier 182, while the weighted signals from 2 to 3 MHz and from 3 to 4 MHz are supplied as negative signals. If the signal in line 17, field one, has a low high frequency section, then the amount of peaking is adjusted automatically. The output signal of summing amplifier 182 is sampled by an analog switch 184 controlled by the vertical sync, and the sampled voltage is stored on a holding capacitor 186 for approximately 1/30 sec. The voltage across capacitor 186 is the error voltage signal that is supplied to the second input of adder 154, shown in FIG. 8, to automatically control peaking.

While the invention has been described in terms of several preferred embodiments with reference to specific design examples, those skilled in the art will recognize that the examples given may be modified without departing from the scope of the invention.

We claim:

1. Circuitry for enhancing the sharpness of bandwidth compressed television signals comprising:
    a television transmitter including linear phase delay and edge peaking means for receiving luminance signals of bandwidth compressed television signals and providing an edge peaked luminance output signal, and first low pass filter means connected to said linear phase delay and edge peaking means for providing a filtered edge peaked luminance output signal; and
    a television receiver including a second low pass filter means connected to receive luminance signals of bandwidth compressed television signals from said television transmitter.

2. Circuitry as recited in claim 1 further comprising equalization means in said television transmitter connected to receive the filtered edge peaked luminance output signal from said first low pass filter means for providing an equalized output signal.

3. Circuitry as recited in claim 1 wherein said first and second low pass filters have a roll-off which is sufficiently slow to prevent ringing of a television signal.

4. Circuitry as recited in claim 3 wherein said first and second low pass filters have the same filter characteristic, said filter characteristic exhibiting said sufficiently slow roll-off to about 5 dB and then a relatively abrupt cutoff.

5. Circuitry as recited in claim 4 wherein said first and second filter means exhibit a Gaussian response.

6. Circuitry as recited in claim 4 wherein said first and second filter means exhibit a fifth order elliptical response.

7. Circuitry as recited in claim 1 wherein said linear phase delay and edge peaking means comprises:
    tapped delay means connected to receive the luminance signals of bandwidth compressed television signals for providing weighted outputs for different phase delays;
    differential combining means connected to said tapped delay means for differentially combining said weighted outputs to provide a combined output signal; and
    peaking means coupled to said differential combining means and said tapped delay means for adding said combined output signal with a signal from one of said weighted outputs.

8. Circuitry as recited in claim 7 wherein said tapped delay means comprises:
    a delay line connected to receive said luminance signals and having a plurality of taps at which output signals are provided with different phase delays; and
    a plurality of potentiometers connected to respective ones of said taps, said potentiometers being adjusted to provide uneven weights to respective ones of the output signals with different phase delays.

9. Circuitry as recited in claim 7 further comprising clamping means connected between said differential combining means and said peaking means for reducing the amplitude of high level signals so that small transitions are peaked to a greater degree than large transitions.

10. Circuitry as recited in claim 7 wherein said peaking means comprises:
    a peaking potentiometer connected to attenuate the output signal of said differential combining means; and
    a summing amplifier connected to sum the output signal from said potentiometer with said signal from one of said weighted outputs.

11. Circuitry as recited in claim 7 wherein said peaking means comprises:
    a potentiometer adjusted to supply a preset peaking voltage;
    adding means connected to said potentiometer for adding a correction voltage to said preset peaking voltage;
    automatic correction means connected to said adding means for generating said correction voltage;
    multiplier means connected to the output of said differential combining means and responsive to said adding means for varying the output signal of said differential combining means; and
    summing means for adding the output signal of said multiplier means with said signal from one of said weighted outputs.

12. Circuitry as recited in claim 11 wherein said adding means comprises:
    a first adder connected to said potentiometer and responsive to a first correction signal generated in response to a vertical line interval pulse correction signal; and
    a second adder connected between said first adder and said multiplier means and responsive to a second correction signal generated as a function of detected horizontal scan noise;
    said automatic correction means generating said first and second correction signals.

* * * * *